United States Patent
Dunlavy et al.

(10) Patent No.: US 10,654,993 B2
(45) Date of Patent: May 19, 2020

(54) RUBBER COMPOSITION CONTAINING A BLEND OF SILICAS AND RELATED PROCESSES FOR IMPROVING WEAR

(71) Applicant: Bridgestone Americas Tire Operations, LLC, Nashville, TN (US)

(72) Inventors: Maryangel G. Dunlavy, Ravenna, OH (US); Michael R. Beaulieu, Acton, MA (US); Natalie V. Weingart, Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 55 days.

(21) Appl. No.: 15/779,642

(22) PCT Filed: Nov. 29, 2016

(86) PCT No.: PCT/US2016/063967
§ 371 (c)(1),
(2) Date: May 29, 2018

(87) PCT Pub. No.: WO2017/095795
PCT Pub. Date: Jun. 8, 2017

(65) Prior Publication Data
US 2019/0241720 A1    Aug. 8, 2019

Related U.S. Application Data

(60) Provisional application No. 62/260,668, filed on Nov. 30, 2015.

(51) Int. Cl.
| | |
|---|---|
| C08L 7/00 | (2006.01) |
| C08K 3/04 | (2006.01) |
| C08K 3/36 | (2006.01) |
| C08L 9/06 | (2006.01) |
| C08K 3/06 | (2006.01) |
| C08K 5/18 | (2006.01) |
| C08L 91/06 | (2006.01) |
| C08K 3/22 | (2006.01) |
| C08K 5/09 | (2006.01) |
| C08L 9/00 | (2006.01) |
| C08L 91/00 | (2006.01) |
| C08J 3/20 | (2006.01) |
| C08K 3/013 | (2018.01) |
| B60C 1/00 | (2006.01) |
| C08J 3/22 | (2006.01) |

(52) U.S. Cl.
CPC .............. *C08L 7/00* (2013.01); *B60C 1/0016* (2013.01); *C08J 3/203* (2013.01); *C08J 3/22* (2013.01); *C08K 3/013* (2018.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08L 9/00* (2013.01); *C08L 9/06* (2013.01); *C08L 91/00* (2013.01); *C08L 91/06* (2013.01); *C08J 2307/00* (2013.01); *C08J 2309/00* (2013.01); *C08J 2407/00* (2013.01); *C08J 2409/00* (2013.01); *C08K 2201/006* (2013.01); *C08L 2310/00* (2013.01)

(58) Field of Classification Search
CPC .. B60C 1/0016; C08J 3/203; C08J 3/22; C08J 2307/00; C08J 2309/00; C08J 2407/00; C08J 2409/00; C08K 3/013; C08K 3/04; C08K 3/06; C08K 3/22; C08K 3/36; C08K 5/09; C08K 5/18; C08K 2201/006; C08L 7/00; C08L 9/00; C08L 9/06; C08L 91/00; C08L 91/06; C08L 2310/00
USPC ....................................................... 523/155
See application file for complete search history.

(56) References Cited

U.S. PATENT DOCUMENTS

| | | | |
|---|---|---|---|
| 4,067,954 A | 1/1978 | Volling | |
| 6,057,397 A | 5/2000 | Takagishi et al. | |
| 6,114,432 A | 9/2000 | Takagishi et al. | |
| 6,506,829 B1 * | 1/2003 | Materne | B60C 1/0016 524/262 |
| 6,608,145 B1 | 8/2003 | Lin et al. | |
| 6,624,233 B2 | 9/2003 | Amadden et al. | |
| 7,491,767 B2 | 2/2009 | Durel et al. | |
| 8,293,833 B2 | 10/2012 | Hochi et al. | |
| 9,416,258 B2 * | 8/2016 | Takeda | B60C 1/0016 |
| 2002/0161099 A1 | 10/2002 | Mahmud et al. | |
| 2005/0016651 A1 | 1/2005 | Durel et al. | |
| 2006/0167159 A1 | 7/2006 | Kubota et al. | |

(Continued)

FOREIGN PATENT DOCUMENTS

| | | | |
|---|---|---|---|
| EP | 0520777 A1 | 12/1992 | |
| EP | 0942029 A2 | 9/1999 | |

(Continued)

OTHER PUBLICATIONS

Extended European Search Report and Search Opinion from application No. EP 16871351.9, dated Oct. 2, 2019.

(Continued)

*Primary Examiner* — Angela C Scott

(74) *Attorney, Agent, or Firm* — Meredith E. Hooker; Jenny L. Sheaffer

(57) ABSTRACT

Disclosed herein are rubber compositions comprising: (a) natural rubber, polyisoprene, or a combination thereof; (b) at least one conjugated diene monomer containing polymer or polymer; (c) a first silica filler having a BET surface area of at least 220 m²/g; (d) a second silica filler having a BET surface area lower than that of the first silica filler and greater than 135 m²/g; and (e) optionally carbon black filler.

20 Claims, No Drawings

(56) References Cited

U.S. PATENT DOCUMENTS

| | | |
|---|---|---|
| 2006/0217473 A1* | 9/2006 | Hergenrother ........ B60C 1/0016 524/261 |
| 2010/0132863 A1 | 6/2010 | Miki et al. |
| 2011/0152434 A1 | 6/2011 | Schweitzer et al. |
| 2012/0283354 A1* | 11/2012 | Hattori ................ B60C 1/0016 523/155 |
| 2014/0155520 A1 | 6/2014 | Takeda |
| 2014/0221525 A1 | 8/2014 | Kojima |
| 2015/0099844 A1 | 4/2015 | Takeda et al. |
| 2015/0148447 A1* | 5/2015 | Takeda ................ B60C 1/0016 523/156 |

FOREIGN PATENT DOCUMENTS

| | | |
|---|---|---|
| EP | 1837369 A1 | 9/2007 |
| EP | 1686151 A1 | 8/2008 |
| EP | 1837369 B1 | 9/2009 |
| EP | 2141029 A1 | 1/2010 |
| EP | 2199334 A1 | 6/2010 |
| EP | 2511334 A1 | 10/2012 |
| EP | 2647657 A1 | 10/2013 |
| JP | 2007-238803 A | 9/2007 |
| JP | 2008-001826 A | 1/2008 |
| JP | 2010-215830 A | 9/2010 |
| JP | 2010-215831 A | 9/2010 |
| JP | 2011-094012 A | 5/2011 |
| KR | 2013-0127755 A | 11/2013 |
| WO | 2011-000133 A1 | 1/2011 |
| WO | 2013-008927 A1 | 1/2013 |
| WO | 2013-057993 A1 | 4/2013 |
| WO | 2013-157545 A1 | 10/2013 |
| WO | WO-2013161876 A1 * | 10/2013 |

OTHER PUBLICATIONS

International Preliminary Report on Patentability and Written Opinion from PCT application No. PCT/US2016/063967, dated Jun. 5, 2018.

Search Report from PCT application No. PCT/US2016/063967, dated Mar. 7, 2017.

* cited by examiner

RUBBER COMPOSITION CONTAINING A BLEND OF SILICAS AND RELATED PROCESSES FOR IMPROVING WEAR

FIELD

The present application is directed to rubber compositions containing a specified blend of silica fillers and to related processes for improving wear of a rubber composition by utilizing the specified blend of silica fillers in the rubber composition.

BACKGROUND

Rubber compositions used in various tire components (especially tire treads) often contain silica filler. Silica filler can be particularly useful in decreasing the rolling resistance of a rubber composition which translates into an improvement in fuel economy when the rubber composition is utilized in a tire tread. The use of silica filler can also influence the wear resistance of a rubber composition, with a higher surface area silica generally improving wear resistance more than a relatively lower surface area silica. An improvement in wear resistance translates into an improvement in tire life when the rubber composition is utilized in a tire tread. However, a silica with a relatively higher surface area is often more difficult to disperse in a rubber composition than a silica with a relatively lower surface area.

SUMMARY

Disclosed herein are rubber compositions containing a specified blend of silica fillers and related processes for improving wear of a rubber composition by utilizing the specified blend of silica fillers in the rubber composition.

In a first embodiment, a rubber composition is disclosed which comprises: (a) natural rubber, polyisoprene, or a combination thereof; (b) at least one conjugated diene monomer containing polymer or polymer; (c) a first silica filler having a BET surface area of at least 220 $m^2/g$; (d) a second silica filler having a BET surface area lower than that of the first silica filler and greater than 135 $m^2/g$; and (e) optionally carbon black filler. Within the rubber composition, the total amount of first silica filler and second silica filler comprises at least 20 phr, and the first and second silica fillers are present in relative amounts of 30:70 to 70:30, respectively. Additionally, within the rubber composition, the total amount of (a) and (b) is 100 parts with (a) comprising at least 25% by weight of those 100 parts.

In a second embodiment, a process for preparing a rubber composition having an improved wear index is disclosed. The process comprises: (a) providing ingredients comprising: (i) a first silica filler having a BET surface area of at least 220 $m^2/g$; (ii) a second silica filler having a BET surface area lower than that of the first silica filler and greater than 135 $m^2/g$; (iii) natural rubber, polyisoprene or a combination thereof; (iv) at least one conjugated diene monomer-containing polymer or copolymer; (v) optionally carbon black; and (vi) a cure package; (b) preparing a masterbatch comprising (i)-(v); and (c) preparing a final batch comprising the masterbatch of (b) and the cure package, thereby resulting in a final rubber composition. According to the process, the total amount of first silica filler and second silica filler comprises at least 20 phr, the first and second silica fillers are present in relative amounts of 30:70 to 70:30, respectively, and the total amount of (iii) and (iv) is 100 parts with (iii) comprising at least 25% by weight of those 100 parts.

DETAILED DESCRIPTION

Disclosed herein are rubber compositions containing a specified blend of silica fillers and related processes for improving wear of a rubber composition by utilizing the specified blend of silica fillers in the rubber composition.

In a first embodiment, a rubber composition is disclosed which comprises: (a) natural rubber, polyisoprene or a combination thereof; (b) at least one conjugated diene monomer containing polymer or polymer; (c) a first silica filler having a BET surface area of at least 220 $m^2/g$; (d) a second silica filler having a BET surface area lower than that of the first silica filler and greater than 135 $m^2/g$; and (e) optionally carbon black filler. Within the rubber composition, the total amount of first silica filler and second silica filler comprises at least 20 phr, and the first and second silica fillers are present in relative amounts of 30:70 to 70:30, respectively. Additionally, within the rubber composition, the total amount of (a) and (b) is 100 parts with (a) comprising at least 25% by weight of those 100 parts.

In a second embodiment, a process for preparing a rubber composition having an improved wear index is disclosed. The process comprises: (a) providing ingredients comprising: (i) a first silica filler having a BET surface area of at least 220 $m^2/g$; (ii) a second silica filler having a BET surface area lower than that of the first silica filler and greater than 135 $m^2/g$; (iii) natural rubber, polyisoprene or a combination thereof; (iv) at least one conjugated diene monomer-containing polymer or copolymer; (v) optionally carbon black; and (vi) a cure package; (b) preparing a masterbatch comprising (i)-(v); and (c) preparing a final batch comprising the masterbatch of (b) and the cure package, thereby resulting in a final rubber composition. According to the process, the total amount of first silica filler and second silica filler comprises at least 20 phr, the first and second silica fillers are present in relative amounts of 30:70 to 70:30, respectively, and the total amount of (iii) and (iv) is 100 parts with (iii) comprising at least 25% by weight of those 100 parts.

Definitions

The terminology as set forth herein is for description of the embodiments only and should not be construed as limiting the invention as a whole.

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

As used herein, the term "phr" means the parts by weight of rubber. If the rubber composition comprises more than one rubber, "phr" means the parts by weight per hundred parts of the sum of all rubbers.

As used herein, the term "natural rubber" or "NR" means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

For the purposes of this disclosure, any reference to a percent amount of a component in the rubber composition means a percent by weight, unless otherwise specified. Similarly, any reference to ratios of component amounts in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and tire treads) containing the rubber compositions disclosed herein.

Silica Fillers

As discussed above, according to the first and second embodiments a first silica filler having a BET surface area of at least 220 $m^2/g$ and a second silica filler having a BET surface area lower than that of the first silica filler and greater than 135 $m^2/g$ are utilized in the rubber composition or as ingredients in preparing the rubber composition. Another way of stating that the second silica filler has a BET surface area lower than that of the first silica filler and greater than 135 $m^2/g$ is to say that the second silica filler has a BET surface area of greater than 135 $m^2/g$ and less than 220 $m^2/g$. In certain embodiments of the first and second embodiments disclosed herein, the surface area of any first silica filler differs from the surface area of any second silica filler by at least 100 $m^2/g$. Any statements herein relating to a blend of silicas should not be construed as requiring any type of specific process limitation upon blending or any particular resulting distribution in the rubber composition but is merely intended to refer to the use of both the first silica and the second silica. In certain embodiments of the first and second embodiments disclosed herein, the rubber composition or ingredients used to prepare the rubber composition does not include any silica filler other than the first and second silica fillers; in such embodiments, the rubber composition of the first embodiment or ingredients used to prepare the rubber composition of the second embodiment can also be described as containing no silica filler other than the first and second silica fillers or 0 phr of silica filler other than the first and second silica filler. In other embodiments of the first and second embodiments disclosed herein, the rubber composition or ingredients used to prepare the rubber composition comprises one or more silica fillers in addition to the first and second silica fillers ("additional silica filler(s)") with any such additional silica filler(s) having properties outside the scope of the properties of the first and second silica fillers. In those embodiments of the first and second embodiments wherein additional silica filler(s) is(are) present, the total amount of such additional silica filler(s) is relatively small or minor, e.g., no more than 10 phr and/or no more than 25% by weight of the total amount of all silica fillers.

As discussed above, according to the first and second embodiments, the total amount of the first silica filler and the second silica filler is at least 20 phr (e.g., 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, 100 phr, 110 phr, 120 phr, or more). In certain embodiments of the first and second embodiments, the total amount of the first silica filler and the second silica filler is at least 25 phr, including 25-120 phr, 25-110 phr, 25-100 phr, 25-90 phr, and 25-80 phr. In certain embodiments of the first and second embodiments, the total amount of the first silica filler and the second silica filler is at least 40 phr, including 40-120 phr, 40-110 phr, 40-100 phr, 40-90 phr, and 40-80 phr. In certain embodiments of the first and second embodiments, the total amount of the first silica filler and the second silica filler is 25-120 phr, 25-110 phr, 25-100 phr, 25-90 phr, 25-80 phr, or an amount within one of the foregoing ranges.

As discussed above, according to the first and second embodiments, the first and second silica fillers are present in the rubber composition or used in the ingredients to prepare the rubber composition in relative amounts (by weight) of 30:70 to 70:30. In other words, the first silica filler is present in an amount of 30-70% by weight (based upon the total weight of the first and second silica fillers) and the second silica filler is present in an amount of 70-30% by weight (also based upon the total weight of the first and second silica fillers). In certain embodiments, the relative amounts of first and second silica filler is 35:65 to 70:30, 40:60 to 70:30, 45:55 to 70:30, 50:50 to 70:30, 55:45 to 70:30, 60:40 to 70:30, 65:35 to 70:30, 25:75 to 65:35, 25:75 to 60:40, 25:75 to 55:45, 25:75 to 50:50, 25:75 to 45:55, 25:75 to 40:60, 25:75 to 35:65, and 25:75 to 30:70. The foregoing relative amounts can also be described as 35-70% by weight first silica filler and 65 to 30% by weight second silica filler; 40-70% by weight first silica filler and 60 to 30% by weight second silica filler; 45-70% by weight first silica filler and 55 to 30% by weight second silica filler; 50-70% by weight first silica filler and 50 to 30% by weight second silica filler; 55-70% by weight first silica filler and 45 to 30% by weight second silica filler; 60-70% by weight first silica filler and 40 to 30% by weight second silica filler; 65-70% by weight first silica filler and 35 to 30% by weight second silica filler; 25 to 65% by weight first silica filler and 75 to 35% by weight second silica filler; 25 to 60% by weight first silica filler and 75 to 40% by weight second silica filler; 25 to 55% by weight first silica filler and 75 to 45% by weight second silica filler; 25 to 50% by weight first silica filler and 75 to 50% by weight second silica filler; 25 to 45% by weight first silica filler and 75 to 55% by weight second silica filler; 25 to 40% by weight first silica filler and 75 to 60% by weight second silica filler; 25 to 35% by weight first silica filler and 75 to 65% by weight second silica filler; 25 to 30% by weight first silica filler and 75 to 70% by weight second silica filler (each % by weight based upon the total weight of the first and second silica fillers).

Suitable silica fillers for use as the first or second silica filler are well known. Non-limiting examples suitable for use as the first or second silica filler according to the embodiments of the first and second embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in certain embodiments of the first and second embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the previously listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates.

The pH of the first and second silica fillers used in the first and second embodiments disclosed herein may vary. In certain embodiments of the first and second embodiments disclosed herein, one or both of the first and second silica fillers has a pH of 5.5 to 8 or slightly below 8 (e.g., 7.6, 7.7, 7.8), preferably 6.3-7.6.

In certain embodiments of the first and second embodiments disclosed herein, as discussed in more detail below, either the first silica filler, the second silica filler, or both comprises a silica that has been pre-treated with a silica coupling agent; preferably the pre-treated silica comprises a silica that has been pre-treated with a silane-containing silica coupling agent.

As discussed in more detail below, various commercial sources exist for silicas which meet the requirements of the first or second silica fillers. Non-limiting examples include silicas sold by PPG Industries/PPG Silica Products (Monroeville, Pa.) under its Hi-Sil® brand, Evonik Industries AG/Evonik Corporation (Parsippany, N.J.) under its ULTRASIL® brand, and Solvay Silica (Lyon, France and Cranbury, N.J.) under its Zeosil® brand.

First Silica Filler

As discussed above, according to the first and second embodiments, the first silica filler has a BET surface area of at least 220 $m^2/g$ (e.g., 220, 225, 230, 235, 240, 245, 250, 255, 260, 265, 270, 275, 280, 285, 290, 295, 300, 305, 310, 315, 320, 325, 330, 335, 340, 345, 350 or more). In certain embodiments of the first and second embodiments, the first silica filler has a BET surface area of at least 230 $m^2/g$, at least 235 $m^2/g$, at least 240 $m^2/g$ or more, including up certain embodiments up to 350 $m^2/g$ as well as 220 $m^2/g$ to 350 $m^2/g$, 225 $m^2/g$ to 350 $m^2/g$, 240 $m^2/g$ to 350 $m^2/g$, 250 $m^2/g$ to 350 $m^2/g$, 220 $m^2/g$ to 325 $m^2/g$, 225 $m^2/g$ to 325 $m^2/g$, 240 $m^2/g$ to 325 $m^2/g$ and 250 $m^2/g$ to 325 $m^2/g$. The surface area values provided herein for silica fillers refer to BET surface area (BET referring to Brunauer, Emmett and Teller) which is a surface area measurement generally determined physical adsorption of a gas (generally nitrogen) on the surface of the solid and by calculating the amount of adsorbate gas corresponding to a monomolecular layer on the surface. The BET surface area numbers referred to herein can be measured according to ASTM standard D1993 which is a multipoint method. According to the first and second embodiments disclosed herein, one or more than one first silica filler may be utilized; preferably only one first silica filler is utilized.

In certain embodiments of the first and second embodiments disclosed herein, the first silica filler meets at least one of the following: (1) a pH ranging from 6.3 to 7.6, or (2) a CTAB ranging from 200 to 300 $m^2/g$.

Various commercial sources exist for silica fillers that meet the requirements discussed above for the first silica filler. Non-limiting examples of these include: Hi-Sil® EZ 200G (BET surface area of 300 $m^2/g$), ULTRASIL® 9000 GR (BET surface area of 225 $m^2/g$), and CARPLEX 67 (from DSL Japan, BET surface area of 380 $m^2/g$).

Second Silica Filler

As discussed above, according to the first and second embodiments disclosed herein, the second silica filler has a BET surface area lower than that of the first silica filler and greater than 135 $m^2/g$. In other words, the second silica filler has a BET surface area of greater than 135 $m^2/g$ and less than 220 $m^2/g$ (e.g., 135, 140, 145, 150, 155, 160, 165, 170, 175, 180, 185, 190, 195, 200, 205, 210, 215 $m^2/g$). In certain embodiments of the first and second embodiments, the second silica filler has a BET surface area of 150 to less than 220 $m^2/g$, 160 to less than 220 $m^2/g$, 150-210 $m^2/g$, 160-210 $m^2/g$, 150-200 $m^2/g$, or 160-200 $m^2/g$. According to the first and second embodiments disclosed herein, one or more than one second silica filler may be utilized; preferably only one second silica filler is utilized.

In certain embodiments of the first and second embodiments disclosed herein, the second silica filler meets at least one of the following: (1) a pH ranging from 6.3 to 7.6, (2) a CTAB ranging from at least 130 up to less than 200 $m^2/g$.

Various commercial sources exist for silica fillers that meet the requirements discussed above for the second silica filler. Non-limiting examples of these include: Hi-Sil® EZ 120G (BET surface area of 160 $m^2/g$), Hi-Sil® EZ 160G (BET surface area of 160 $m^2/g$), Hi-Sil® HDP 320G (BET surface area of 160 $m^2/g$), Hi-Sil® 190G (BET surface area of 195 $m^2/g$), Hi-Sil® 210 (BET surface area of 135 $m^2/g$), Hi-Sil® 243LD (BET surface area of 135 $m^2/g$), Hi-Sil® EZ 134G (BET surface area of 180 $m^2/g$), ULTRASIL® VN3 (BET surface area of 180 $m^2/g$), ULTRASIL® VN3 GR (BET surface area of 180 $m^2/g$), ULTRASIL® 7005 (BET surface area of 190 $m^2/g$), ULTRASIL® 7000 GR (BET surface area of 175 $m^2/g$), Zeosil® 1165MP (BET surface area of 165 $m^2/g$), Zeosil® Premium (BET surface area of 215 $m^2/g$), and ZHRS® (BET surface area of 200 $m^2/g$).

Other Fillers

In certain embodiments of the first and second embodiments disclosed herein, the rubber composition further comprises or the ingredients used to prepare the rubber composition further comprise one or more additional fillers (i.e., in addition to the first and second silica fillers discussed above). Various fillers are well known for use in rubber compositions, particularly rubber compositions used in tire components such as tire treads.

Carbon Black

In certain embodiments of the first and second embodiments disclosed herein, the rubber composition further comprises or the ingredients used to prepare the rubber composition further comprise one or more carbon blacks. In other words, carbon black is not considered to be an essential component of the rubber composition in all embodiments of the first and second embodiments disclosed herein. In those embodiments of the first and second embodiments where one or more carbon blacks are used, the total amount of carbon black is 5 to 200 phr. In certain embodiments of the first and second embodiments, one or more than one carbon black is utilized in a total amount of 5 to 100 phr, 5 to 90 phr, 5 to 80 phr, 5 to 70 phr, 5 to 60 phr, 5 to 50 phr, 10 to 100 phr, 10 to 90 phr, 10 to 80 phr, 10 to 70 phr, 10 to 60 phr, or 10 to 50 phr. In certain embodiments of the first and second embodiments disclosed herein, carbon black is present in one of the foregoing amounts which is sufficient to constitute 5% to 30%, 5% to 20%, 10% to 30%, or 10% to 20% by weight of the total amount of silica and carbon black fillers. In certain embodiments of the first and second embodiments disclosed herein, the carbon black (in total) comprises no more than 30% by weight of the total amount of silica and carbon black fillers in the rubber composition.

Generally, suitable carbon black(s) for use in certain embodiments of the first and second embodiments disclosed herein include(s) any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application for carbon blacks refer to values determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first and second embodiments disclosed herein, the rubber composition includes a mixture of two or more of the foregoing blacks. Typical suitable carbon blacks for use in certain embodiments of the first and second embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Fillers Other than Silica and Carbon Black

In certain embodiments of the first and second embodiments disclosed herein, the rubber composition further comprises or the ingredients used to prepare the rubber composition further comprise at least one additional filler, i.e., in addition to the silica filler and the optional carbon black. The amount of these one or more additional fillers used can vary; in certain embodiments of the first and second embodiments the amount of each additional filler is 1-50 phr or 1-25 phr, or the total amount of all additional fillers is 1-50 phr. Non-limiting examples of suitable additional fillers for use in the rubber compositions of certain embodiments of the first-third embodiments disclosed herein include, but are not limited to, talc, clay, boron nitride, aluminum nitride, titanium dioxide, reinforcing zinc oxide, alumina ($Al_2O_3$), aluminum hydrate ($Al_2O_3.H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nR_2O$], zirconium carbonate [$Zr(CO_3)_2$], crystalline aluminosilicates, and combinations thereof. As those of skill in the art will understand, certain of the foregoing additional fillers can be described as non-reinforcing fillers. In certain embodiments herein, the term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments herein, the term "non-reinforcing filler" is used to refer to a particulate material that has a particle size of greater than about 1000 nm (including greater than 1000 nm). In certain embodiments of the first and second embodiments disclosed herein, the rubber composition further comprises or the ingredients used to prepare the rubber composition further comprise at least one of the following non-reinforcing fillers: clay, graphite, titanium dioxide, magnesium dioxide, aluminum oxide, starch, boron nitride, silicon nitride, aluminum nitride, and silicon carbide.

Rubbers

As discussed above, according to the first embodiment, the rubber composition comprises natural rubber, polyisoprene or a combination thereof, and at least one conjugated diene monomer-containing polymer or copolymer with the total amount of natural rubber, polyisoprene or a combination thereof, and at least one conjugated diene monomer-containing polymer or copolymer being 100 phr (or 100 parts) and the natural rubber comprising at least 25% by weight (i.e., at least 25 parts or 25 phr of the 100 parts or 100 phr, respectively) thereof. As also discussed above, according to the second embodiment, the ingredients used to prepare the rubber composition include natural rubber, polyisoprene or a combination thereof, and at least one conjugated diene monomer-containing polymer or copolymer with the total amount of natural rubber, polyisoprene or a combination thereof, and at least one conjugated diene monomer-containing polymer or copolymer being 100 phr (or 100 parts) and the natural rubber comprising at least 25% by weight (i.e., at least 25 parts or 25 phr of the 100 parts or 100 phr, respectively). For ease of discussion, the natural rubber, polyisoprene or a combination thereof, and at least one conjugated diene monomer-containing polymer or copolymer components of both the first and second embodiments are discussed together herein and the discussion should be understood to apply equally to both embodiments unless stated differently. In certain embodiments of the first and second embodiments, the natural rubber, polyisoprene or a combination thereof comprises 25-95% (e.g., 25%, 30%, by weight of the 100 parts or 100 phr (in total) of natural rubber and at least one conjugated diene monomer-containing polymer or copolymer is natural rubber, including at least 30%, at least 35%, at least 40%, at least 45% and at least 50% is natural rubber) In certain such embodiments, up to 20 phr (i.e., 0-20 phr) of the 25-95 phr total of natural rubber, polyisoprene or a combination thereof is polyisoprene with the remainder of the 25-95 phr being natural rubber. As discussed in more detail below, one or more than one polymer may be utilized for the at least one conjugated diene monomer-containing polymer or copolymer component of the first and second embodiments disclosed herein. As non-limiting examples, a rubber composition according to the first embodiment or made by the process of the second embodiment could utilize 25 phr (or parts) of natural rubber in combination with 75 phr (or parts) of a styrene-butadiene copolymer; 40 phr (or parts) of natural rubber in combination with 60 phr (or parts) of a styrene-butadiene copolymer; or 40 phr (or parts) of natural rubber in combination with 40 phr (or parts) of a styrene-butadiene copolymer and 20 phr (or parts) of a polybutadiene polymer. As discussed above, in certain such embodiments up to 20 phr of the natural rubber could comprise polyisoprene.

Natural Rubber, Polyisoprene or a Combination Thereof

As discussed above, the rubber composition of the first embodiment and the ingredients used to prepare the rubber composition in the second embodiment include natural rubber, polyisoprene, or a combination thereof in an amount sufficient to provide at least 25% by weight of the total amount of natural rubber and at least one conjugated diene monomer-containing polymer or copolymer. Exemplary and specific amounts are as discussed above. One or more than one natural rubber may be utilized. In certain embodiments, up to 20 phr (i.e., 0-20 phr) of the 25-95 phr total of natural rubber, polyisoprene or a combination thereof is polyisoprene with the remainder of the 25-95 phr being natural rubber. In certain embodiments of the first and second embodiments disclosed herein, the natural rubber comprises a Hevea natural rubber. In other embodiments of the first and second embodiments disclosed herein, the natural rubber comprises a non-Hevea rubber. In certain embodiments of the first and second embodiments disclosed herein, the natural rubber comprises both a Hevea natural rubber and a non-Hevea natural rubber.

At Least One Conjugated Diene Monomer-Containing Polymer or Copolymer

As discussed above, the rubber composition of the first embodiment and the ingredients used to prepare the rubber composition in the second embodiment include at least one conjugated diene monomer-containing polymer or copolymer. Based upon the amount of natural rubber being at least 25% by weight, the total amount of conjugated diene monomer-containing polymer or copolymer can be described as less than 75% by weight (i.e., less than 75 parts or 75 phr of the total 100 parts or 100 phr of natural rubber and at least one conjugated diene monomer-containing polymer or copolymer). One or more than one conjugated diene monomer-containing polymer or copolymer can be utilized. Non-limiting examples of suitable polymers that are conjugated diene monomer-containing polymers or copolymers include, but are not limited to, styrene-butadiene rubber, polybutadiene, polyisoprene, styrene-isoprene rubber, and styrene-butadiene-isoprene rubber. Accordingly, in certain embodiments of the first and second embodiments disclosed herein the rubber composition comprises or the ingredients used to prepare the rubber composition comprise polybutadiene, styrene-butadiene copolymer, polyisoprene, styrene-isoprene rubber, styrene-butadiene-isoprene rubber, or a combination thereof.

Non-limiting examples of suitable conjugated diene monomers according to certain embodiments of the first and second embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated dienes may be utilized in certain embodiments. In certain embodiments of the first and second embodiments, the conjugated diene monomer comprises 1,3-butadiene.

In certain embodiments of the first and second embodiments disclosed herein, the conjugated diene monomer-containing polymer further comprises at least one vinyl aromatic monomer) (i.e., in addition to the conjugated diene monomer). In certain embodiments of the first and second embodiments disclosed herein, the at least one vinyl aromatic monomer comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first and second embodiments disclosed herein, the at least one vinyl aromatic monomer comprises styrene.

As discussed above, in certain embodiments of the first and second embodiments disclosed herein, the at least one conjugated diene monomer-containing polymer or copolymer comprises polybutadiene. In certain embodiments according to the first and second embodiments, the polybutadiene comprises a high cis polybutadiene. In certain embodiments according to the first and second embodiments, the high cis polybutadiene has a cis 1,4-bond content of 85% of greater, 90% or greater, 92% or greater, or 95% or greater. In certain embodiments of the first and second embodiments, the polybutadiene has a cis 1,4-bond content of 85-99%, 90-99%, 90-98%, 90-97%, 92-99%, 92-98%, 92-97%, 95-99%, 95-98%, or 95-97%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis 1,4-, vinyl 1,2-, and trans 1,4-bond linkage contents in a given polymer such as polybutadiene can be determined by standard and well-established analytical methods such as infrared spectroscopy.

As discussed above, in certain embodiments according to the first and second embodiments, the at least one conjugated diene monomer-containing polymer or copolymer comprises polyisoprene. In certain embodiments according to the first and second embodiments, the polyisoprene comprises high cis polyisoprene. In certain embodiments according to the first and second embodiments, the high cis polyisoprene has a cis 1,4-bond content of 90% of greater. In certain embodiments of the first and second embodiments, the polyisoprene has a cis 1,4-bond content of 90% or greater, 92% or greater, or 95% or greater. In certain embodiments of the first and second embodiments, the polyisoprene has a cis 1,4-bond content of 90-99%, 90-98%, 90-97%, 92-99%, 92-98%, 92-97%, 95-99%, 95-98%, or 95-97%.

Generally, various polymerization methods are known for producing polyisoprene, including polyisoprene having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene mer units. Polymerization of high-cis polyisoprene is described in U.S. Pat. Nos. 8,664,343; 8,188,201; 7,008,899; 6,897,270; and 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, cis-1,2-, and trans-1,4-linkage contents in a given polymer such as polyisoprene can be determined by standard and well-established analytical methods such as infrared spectroscopy.

As discussed above, in certain embodiments according to the first and second embodiments disclosed herein, the at least one conjugated diene monomer-containing polymer or copolymer comprises the copolymer styrene-butadiene rubber (SBR). SBR is a copolymer of styrene and butadiene monomers. In certain embodiments according to the first and second embodiments disclosed herein, the SBR used comprises 10 to 50% styrene monomer and 50 to 90% butadiene monomer by weight. Generally, SBR is produced by solution or emulsion polymerization methods; however, it should be understood that the particular method by which the SBR is produced is not limited. The styrene and butadiene monomer content in a given SBR copolymer can be determined by standard and well-established analytical methods such as infrared spectroscopy.

Numerous commercial sources of the foregoing rubbers are well-known. As non-limiting examples, Firestone Polymers offers various grades of its Diene™ polybutadiene which have varying cis 1,4-bond contents (e.g., 40% and 96%) as well as various grades of its Duradene™ solution polymerized styrene-butadiene copolymer. Other commercial sources of the rubber polymers and copolymer are well known, including sources for emulsion polymerized styrene-butadiene copolymer, functionalized versions of styrene-butadiene copolymer, polybutadiene, synthetic polyisoprene rubber, and natural rubber.

In certain embodiments according to the first and second embodiments disclosed herein, the at least one conjugated diene monomer-containing polymer or copolymer comprises a functionalized polymer or copolymer. In certain such embodiments, the rubber composition comprises about 5 up to 75 parts or phr of at least one functionalized polymer or copolymer, including 5 to 75 parts or phr, 10 to 70 parts or phr, 10 to 60 parts or phr, and 10 to 50 parts or phr. In certain embodiments according to the first and second embodiments disclosed herein, the functionalized polymer or copolymer contains a silica-reactive functional group, a nitrogen-containing functional group, an oxygen-containing functional group, a sulfur-containing functional group, or a combination of the foregoing. Non-limiting examples of silica-reactive functional groups that are known to be utilized in functionalizing conjugated diene monomer-containing polymers and copolymers and are suitable for use in certain embodiments of the first and second embodiments disclosed herein include nitrogen-containing functional groups, silicon-containing functional groups, oxygen or sulfur-containing functional groups, and metal-containing functional groups. As used herein, the term functionalized polymer should be understood to include polymers and copolymers with a functional group at one or both terminus (e.g., from use of a functionalized initiator, a functionalized terminator, or both), a functional group in the main chain of the polymer, and combinations thereof. For example, a silica-reactive functionalized conjugated diene monomer-containing polymer or copolymer may have the functional group at one or both terminus, in the main chain thereof, or both in the main chain and at one or both terminus.

Non-limiting examples of nitrogen-containing functional groups that are known to be utilized in functionalizing conjugated diene monomer-containing polymers and copolymers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first and second embodiments disclosed herein, at least one functionalized conjugated diene monomer-containing polymer or copolymer rubber is used which has at least one functional group selected from the foregoing list.

Non-limiting examples of silicon-containing functional groups that are known to be utilized in functionalizing conjugated diene monomer-containing polymers and copolymers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing conjugated diene monomer-containing polymers and copolymers also include those disclosed in U.S. Pat. No. 6,369,167, the entire disclosure of which is hereby incorporated by reference. In certain embodiments of the first and second embodiments disclosed herein, a functionalized conjugated diene monomer-containing polymer or copolymer having at least one functional group selected from the foregoing list is utilized.

Non-limiting examples of oxygen or sulfur-containing functional groups that are known to be utilized in functionalizing conjugated diene monomer-containing polymers and copolymers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thio-ester group, a thioaldehyde group, a thioalkoxy group and a thioketone group. In certain embodiments, the foregoing alkoxy group may be an alcohol-derived alkoxy group derived from a benzophenone. In certain embodiments according to the first and second embodiments disclosed herein, a functionalized conjugated diene monomer-containing polymer or copolymer rubber having at least one functional group selected from the foregoing list is utilized.

Cure Package

As discussed above, according to the second embodiment, the ingredients used in the process of preparing the rubber composition include a cure package. In certain embodiments of the first embodiment, the rubber composition will also include (further comprise) a cure package. The following discussion concerning the cure package should be understood to apply equally to the second embodiment as well as those embodiments of the first embodiment that include a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. Notably, one or more than one of each of the foregoing can be utilized (e.g., one or more than one vulcanizing accelerator). In certain embodiments, the cure package includes at least one vulcanizing agent, at least one vulcanizing accelerator, at least one vulcanizing activator, and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first and second embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the first and second embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tort-butyl-2-benzothiazole-sulfonamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

In certain embodiments of the first and second embodiments, one or more additional ingredients, i.e., in addition to those discussed above may be included.

Silica Coupling Agents

In certain embodiments of the first and second embodiments disclosed herein, the rubber composition includes or the ingredients used to prepare the rubber composition include one or more silica coupling agents. Silica coupling agents are useful in preventing or reducing aggregation of the silica filler within the rubber composition. Aggregates of the silica filler particles are believed to undesirably increase the viscosity of the rubber composition, and, therefore, preventing this aggregation reduces the viscosity and improves the processibility and blending of the rubber composition.

Generally, any conventional type of silica coupling agent can be used in those embodiments of the first and second embodiments which include one or more silica coupling agents, such as those having a silane and a constituent component or moiety that can react with a polymer, particularly a vulcanizable polymer. The silica coupling agent acts as a connecting bridge between silica and the polymer. Suitable silica coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the first and second embodiments, the silica coupling agent is in the form of a pre-treated silica, i.e., a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS-R^3-Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B-S-R^6-Si-X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in the rubber compositions of certain exemplary embodiments according to the first and second embodiments disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyldimethoxysilane, and mixtures thereof.

Non-limiting examples of bis(trialkoxysilylorgano)polysulfides suitable for use in certain exemplary embodiments according to the first and second embodiments disclosed herein include bis(trialkoxysilylorgano) disulfides and bis (trialkoxysilylorgano)tetrasulfides. Specific non-limiting examples of bis(trialkoxysilylorgano)disulfides suitable for use in certain exemplary embodiments according to the first and second embodiments disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano) tetrasulfide silica coupling agents suitable for use in certain exemplary embodiments according to the first and second embodiments disclosed herein include, but are not limited to, bis(3-triethoxysilylpropyl)tetrasulfide, bis(2-triethoxysilylethyl) tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain exemplary embodiments of the first and second embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain exemplary embodiments according to the first and second embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments of the first and second embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacelate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthiocetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments of the first and second embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain exemplary embodiments according to the first and second embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, Coupsil 6508, Agilon 400™ silica from PPG Industries, Agilon 454® silica from PPG Industries, and 458® silica from PPG Industries. In those embodiments of the first and second embodiments disclosed herein where the silica comprises a pre-treated silica, the pre-treated silica is used in an amount as previously disclosed for the reinforcing silica filler.

The amount of silica coupling agent used in those embodiments of the first and second embodiments which include a silica coupling agent may vary. In certain embodiments of the first and second embodiments disclosed herein, the silica coupling agent is present in an amount sufficient to provide a ratio of the total amount of silica coupling agent to reinforcing silica filler of 1:100 to 1:5 (i.e., 1 to 20 parts by weight per 100 parts of silica), including 1:100 to 1:10, 1:100 to 1:20, 1:100 to 1:25 as well as 1:100 to 1:50. In certain embodiments according to the first and second embodiments disclosed herein, the amount of silica coupling agent in the rubber composition is 0.01 to 10 phr, 0.01 to 5 phr, or 0.01 to 3 phr.

Other Ingredients

Other ingredients that may be employed in the rubber compositions of certain embodiments of the first and second embodiments disclosed herein include those that are well known to those of skill in the art such as one or more of the following: oils (processing and extender), waxes, processing aids, antioxidants, tackifying resins, reinforcing resins, and peptizers. Oils may also be referred to as plasticizers.

Various types of tackifying resins are known to those of skill in the art and may be utilized in the rubber compositions of certain embodiments of the first and second embodiments; these include but not limited to: rosin and its derivatives, hydrocarbon resins, and phenol-formaldehyde resins. One or more than one type as well as one or more than one of each type may be utilized in certain embodiments of the first and second embodiments. As used herein the term "resin" is intended to encompass compounds which are solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols. In certain embodiments of the first and second embodiments, the total amount of tackifying resin used is 1 to 25 phr, including 1 to 20 phr, 1 to 15 phr and 1 to 10 phr. In certain embodiments of the first and second embodiments, the total amount of phenolic resin, acrylic resin, and polyphenylene resin is no more than 25 phr, including no more than 20 phr, no more than 15 phr, no more than 10 phr, and no more than 5 phr.

Various antioxidants are known to those of skill in the art and may be utilized in the rubber compositions of certain embodiments of the first and second embodiments; these include but are not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first and second embodiments. In certain embodiments of the first and second embodiments, the total amount of antioxidant(s) used is 1 to 5 phr.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer or as a processing or free oil. Generally, for most uses of the rubber compositions in tire components the total amount of oil used (processing oil and extender oil) in the rubber compositions and methods disclosed herein ranges about 1 to about 40 phr, 1 to 40 phr, about 1 to about 20 phr, or 1 to 20 phr.

Processes for Preparing Rubber Compositions

As discussed above, according to the second embodiment disclosed herein, a process for preparing a rubber composition is disclosed. The process comprises: (a) providing ingredients comprising: (i)-(vi) as described above, (b) preparing a masterbatch comprising (i)-(v); and (c) preparing a final batch comprising the masterbatch from (b) and cure package (vi), thereby resulting in a final rubber composition. In certain embodiments of the first embodiment, a similar mixing process may be used to prepare the rubber composition of the first embodiment (i.e., preparing a masterbatch, followed by preparation of a final batch).

In certain embodiments of the second embodiment, more than one masterbatch stage may be utilized, e.g., an initial masterbatch followed by a secondary masterbatch. In certain such embodiments, step (b) of preparing a masterbatch comprises producing an initial masterbatch comprising at least a majority of (i), optionally up to a minority of (ii), at least a portion of (iii), at least a portion of (iv) and any (v), followed by producing a secondary masterbatch comprising the initial masterbatch, at least a majority of (ii), and any remaining (i), (iii) and (iv); and (c) comprises addition of the secondary masterbatch and the cure package. In other words, in such an embodiment, at least a majority of the first silica filler is added in an initial masterbatch stage and at least a majority of the second silica filler is added in secondary masterbatch stage; in certain such embodiments, the entirety of the first silica filler is added in the initial masterbatch stage, the entirety of the second silica filler is added in the secondary masterbatch stage, or both. In certain embodiments of the second embodiment, the entirety of the first and second silica fillers are added in one masterbatch stage together. In certain embodiments of the second embodiment, the entirety of the first and second silica fillers are added in an initial masterbatch. In certain embodiments of the second embodiment, all of the natural rubber, polyisoprene or a combination thereof, and all of the at least one conjugated diene monomer-containing polymer or copolymer are added in an initial masterbatch. In certain embodiments of the second embodiment, the process further comprises a remill mixing step subsequent to any masterbatch step but prior to preparing the final batch; such a remill mixing step can be helpful in incorporating the silica fillers into the rubber composition. The foregoing process options may also (optionally) be utilized in preparing the rubber composition of the first embodiment.

The preparation of the masterbatch(es) and the final batch may generally involve mixing together the ingredients for the rubber composition (as disclosed above) by methods known in the art, such as, for example, by kneading the ingredients together in a Banbury mixer or on a milled roll. The term masterbatch as used herein is intended to refer to a non-productive mixing stage, which is known to those of skill in the art and generally understood to be a mixing stage where no vulcanizing agents or vulcanization accelerators are added. The term final batch as used herein is intended to refer to a productive mixing stage, which is also known to those of skill in the art and generally understood to be the mixing stage where the vulcanizing agents and vulcanization accelerators are added into the rubber composition. In certain embodiments, the rubber composition of the first embodiment may be prepared according to a similar process.

In certain embodiments of the second embodiment, the master batch mixing stage(s) may be conducted at a temperature of about 130° C. to about 200° C. In certain embodiments of the second embodiment, the final mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C. In certain embodiments, the foregoing temperatures may be utilized to prepare rubber compositions according to the first embodiment.

Improved Wear

As discussed above, according to the second embodiment disclosed herein, a process is provided for preparing a rubber composition having an improved wear index. In certain embodiments of the second embodiment, the rubber composition has an improved wear index that comprises at least 5% improvement in wear index as compared to a rubber composition having equivalent ingredients other than replacing the first and second silica fillers with an equivalent (total) amount of a silica filler having a surface area intermediary to that of the first and second silica fillers. In certain embodiments of the second embodiment, the improvement in wear index is at least 10%, at least 15%, or more, including 5-20%, 5-15%, and 10-20% as compared to a rubber composition having equivalent ingredients other than replacing the first and second silica fillers with an equivalent (total) amount of a silica filler having a surface area intermediary to that of the first and second silica fillers. An example of the improved wear index that can be achieved is provided in the working Examples described in detail below, including use of a comparative rubber composition as described above. Wear index can be calculated by various methods, including the method provided in the Example section below.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the first and second silica fillers utilized in the examples can be utilized with rubbers, fillers, and other ingredients which differ in amount, composition, or both from those used in the examples (i.e., as fully disclosed in the preceding paragraphs). Moreover, first and second silica fillers can be utilized in amounts, relative amounts and from sources (accordingly, having different BET surface areas) that differ from those provided in the examples (i.e., as fully disclosed in the preceding paragraphs).

Examples C-1 to C-6, C-8 to C-10 and 1-5

In Examples C-1 to C-6, C-8 to C-10 and 1-5, rubber compositions containing silica filler were prepared using combinations of natural rubber and polybutadiene. Examples 1-5 are provided as working examples of the present disclosure and each utilize a first silica filler and a second silica filler having BET surface areas falling within the ranges described above. Examples C-1 to C-6 and C-8 to C-10 are comparative examples. The silica filler denoted as silica #1 was obtained from Solvay/Rhodia and had a BET surface area of 160 $m^2/g$. The silica filler denoted as silica #2 was obtained from PPG and had a BET surface area of 300 $m^2/g$. The silica filler denoted as silica #3 was obtained from PPG and had a BET surface area of 210 $m^2/g$. The rubber compositions were prepared in a three stage mixing process (i.e., two master-batch stages, and final batch) according to the formulations shown in Tables 1 and 2. The amount of each ingredient used is reported as parts per hundred rubber (phr). The mixing process used for these formulations is outlined in Table 1-A below.

TABLE 1

|  | 1 | 2 | C-4 | 3 | C-5 |
|---|---|---|---|---|---|
| Initial Masterbatch | | | | | |
| Natural rubber | 50 | 50 | 50 | 50 | 50 |
| Polybutadiene | 50 | 50 | 50 | 50 | 50 |
| Silica #1 | 15 | 20 | 0 | 10 | 0 |
| Silica #2 | 15 | 20 | 0 | 10 | 0 |
| Silica #3 | 0 | 0 | 30 | 0 | 20 |
| Carbon black | 15 | 5 | 15 | 25 | 25 |
| Silica coupler | 2.5 | 3.34 | 2.5 | 1.68 | 1.68 |
| 6PPD | 0.95 | 0.95 | 0.95 | 0.95 | 0.95 |
| Processing oil | 10 | 10 | 10 | 10 | 10 |
| Wax | 2 | 2 | 2 | 2 | 2 |
| Stearic acid | 2 | 2 | 2 | 2 | 2 |
| Secondary Masterbatch | | | | | |
| Silica #1 | 5 | 0 | 0 | 0 | 0 |
| Silica #2 | 5 | 0 | 0 | 0 | 0 |
| Silica #3 | 0 | 0 | 10 | 0 | 0 |
| Carbon black | 5 | 15 | 5 | 15 | 15 |
| Silica coupler | 0.84 | 0 | 0.84 | 0 | 0 |
| Final Batch | | | | | |
| Sulfur | 1.5 | 1.5 | 1.5 | 1.5 | 1.5 |
| Vulcanizing accelerators | 4 | 4 | 4 | 4 | 4 |
| Zinc oxide | 2.5 | 2.5 | 2.5 | 2.5 | 2.5 |
| Summary | | | | | |
| Total carbon black | 20 | 20 | 20 | 40 | 40 |
| Total silica #1 | 20 | 20 | 0 | 10 | 0 |
| Total silica #2 | 20 | 20 | 0 | 10 | 0 |

TABLE 1-continued

|  | 1 | 2 | C-4 | 3 | C-5 |
|---|---|---|---|---|---|
| Total silica #3 | 0 | 0 | 40 | 0 | 20 |
| Total all silicas | 40 | 40 | 40 | 20 | 20 |
| Properties |  |  |  |  |  |
| Indexed RPA Viscosity | 107 | 110 | 100 | 105 | 100 |
| Wear index (Ctrl = 100) | 106 | 114 | 100 | 115 | 100 |

TABLE 1-A

Mixing Parameters

| Stage | Time | Condition |
|---|---|---|
| Masterbatch Stage 1 (initial temp: 65° C., rotor rpm started at 65) | 0 seconds<br>30 seconds | Charge polymers<br>Charge ingredients as indicated in Table 1, increase rotor to 75 rpm<br>Drop based on max temperature of 311° F. (155° C.) |
| Masterbatch Stage 2 (initial temp: 65° C., rotor rpm started at 65) | 0 seconds | Charge additional ingredients listed under Secondary Masterbatch in Table 1.<br>Drop based on max temperature of 311° F. (155° C.) |
| Final Batch Stage (initial temp: 65° C., rotor rpm at 65) | 0 seconds<br>0 seconds | Charge Remill<br>Charge curatives<br>Drop based on max temperature of 210° F. (99° C.) |

Properties of the rubber compositions C-1 to C-6, C-8 to C-10, and 1-5 were tested as follows. Results are reported in either Table 1 or Table 2. After curing at 160° C. for 24 minutes samples were taken from the rubber composition of each of the examples. The wear resistance of the test samples was evaluated using the Lambourn Abrasion test. Test specimens were rubber wheels of about 48 mm in outside diameter, about 22 mm in inside diameter and about 4.8 mm in thickness. The test specimens were placed on an axle and run at various slip ratios against a driven abrasive surface for approximately 75 seconds. The abrading surface used was 120 grit 3M-ite. A load of about 2.5 kg was applied to the rubber wheel during testing. A linear, least squares curve-fit was applied to the weight loss data as a function of time. The slope of the line is the abrasion rate. The reported wear index is one-hundred multiplied by the control compound abrasion rate divided by the subject compound abrasion rate. Thus, a wear index greater than 100 indicates that the subject composition has improved abrasion (abrades at a lower rate) than its respective control composition.

The viscosities disclosed herein are real dynamic viscosities determined using an Alpha Technologies RPA (Rubber Process Analyzer) instrument which is rotorless. Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosity data reported is from a run conducted at 266° F., G' at 0.2 minutes. Notably, the indexed RPA viscosity values reported herein were calculated by dividing a measured value for an example by the measured value for that example's control such that a higher index RPA viscosity value indicates an increase in viscosity.

As can be seen from the property values provided for the examples in Table 1, the use of equivalent amounts of silica #1 and silica #2 in a total amount of 40 phr along with 20 phr of carbon black (compositions 1 and 2) resulted in a reduced wear rate (which is indicated by a higher wear index value as calculated herein) as compared to the use of 40 phr of silica having an intermediary surface area along with 20 phr of carbon black (comparative composition C-4). Also, the use of equivalent amounts of silica #1 and silica #2 in a total amount of 20 phr along with 40 phr of carbon black (composition 3) resulted in a reduced wear rate (which is indicated by a higher wear index value as calculated herein) as compared to the use of 20 phr of silica #3 (having an intermediary surface area) along with 40 phr of carbon black (comparative composition C-5). The results show the surprising effect of being able to reduce the wear rate (or improve the wear index) of a rubber composition by utilizing two silicas of differing BET surface areas as compared to the same amount of one silica having an intermediary BET surface area. The wear index value for examples 1 and 2 were calculated by dividing the wear rate (in mg) of control example C-4 by the wear rate (in mg) for example 1 and example 2, respectively, and multiplying by 100. The wear index value for example 3 was calculated using the same procedure except using C-5 as the control. For ease of reading, the examples within Table 1 have been grouped together with their respective control.

TABLE 2

|  | C-1* | C-2 | C-3 | C-6 | 4 | C-8 | C-9 | C-10 | 5 |
|---|---|---|---|---|---|---|---|---|---|
| Initial Masterbatch |  |  |  |  |  |  |  |  |  |
| Natural rubber | 50 | 50 | 50 | 50 | 50 | 0 | 0 | 50 | 50 |
| Polybutadiene | 50 | 50 | 50 | 50 | 50 | 50 | 50 | 0 | 0 |
| Styrenebutadiene (oil-extended) | 0 | 0 | 0 | 0 | 0 | 68.75 | 68.75 | 68.75 | 68.75 |
| Silica #1 | 0 | 36 | 9 | 15 | 22.5 | 0 | 22.5 | 0 | 22.5 |
| Silica #2 | 0 | 9 | 36 | 15 | 22.5 | 0 | 22.5 | 0 | 22.5 |
| Silica #3 | 45 | 0 | 0 | 15 | 0 | 45 | 0 | 45 | 0 |
| Carbon black | 5 | 5 | 5 | 5 | 5 | 5 | 5 | 5 | 5 |
| Silica coupler | 3.78 | 3.78 | 3.78 | 3.78 | 3.78 | 3.78 | 3.78 | 3.78 | 3.78 |
| 6PPD | 0.95 | 0.95 | 0.95 | 0.95 | 0.95 | 0.95 | 0.95 | 0.95 | 0.95 |
| Processing oil | 10 | 10 | 10 | 10 | 10 | 10 | 10 | 10 | 10 |
| Wax | 2 | 2 | 2 | 2 | 2 | 2 | 2 | 2 | 2 |
| Stearic acid | 2 | 2 | 2 | 2 | 2 | 2 | 2 | 2 | 2 |
| Secondary Masterbatch |  |  |  |  |  |  |  |  |  |
| Silica #1 | 0 | 5 | 5 | 3.33 | 5 | 0 | 5 | 0 | 5 |

TABLE 2-continued

|  | C-1* | C-2 | C-3 | C-6 | 4 | C-8 | C-9 | C-10 | 5 |
|---|---|---|---|---|---|---|---|---|---|
| Silica #2 | 10 | 5 | 5 | 3.33 | 5 | 0 | 5 | 0 | 5 |
| Silica #3 | 0 | 0 | 0 | 3.33 | 0 | 10 | 0 | 10 | 0 |
| Silica coupler | 0.84 | 0.84 | 0.84 | 0.84 | 0.84 | 0.84 | 0.84 | 0.84 | 0.84 |
| Final Batch | | | | | | | | | |
| Sulfur | 1.5 | 1.5 | 1.5 | 1.5 | 1.5 | 1.5 | 1.5 | 1.5 | 1.5 |
| Vulcanizing accelerators | 4 | 4 | 4 | 4 | 4 | 4 | 4 | 4 | 4 |
| Zinc oxide | 2.5 | 2.5 | 2.5 | 2.5 | 2.5 | 2.5 | 2.5 | 2.5 | 2.5 |
| Summary | | | | | | | | | |
| Total carbon black | 5 | 5 | 5 | 5 | 5 | 5 | 5 | 5 | 5 |
| Silica #1 | 0 | 41 | 14 | 18.33 | 27.5 | 0 | 27.5 | 0 | 27.5 |
| Silica #2 | 0 | 14 | 41 | 18.33 | 27.5 | 0 | 27.5 | 0 | 27.5 |
| Silica #3 | 55 | 0 | 0 | 18.33 | 0 | 55 | 0 | 55 | 0 |
| Total all silicas | 55 | 55 | 55 | 55 | 55 | 55 | 55 | 55 | 55 |
| Properties | | | | | | | | | |
| Indexed RPA Viscosity | 100 | 95 | 117 | 102 | 102 | 94 | 100 | 100 | 112 |
| Wear index (Ctrl = 100) | 100 | 102 | 97 | 92 | 112 | 106 | 100 | 100 | 113 |

*Properties reported are average of two compositions having the same ingredients.

According to the data in Table 2, the use of equivalent amounts of silica #1 and silica #2 in a total amount of 55 phr along with 5 phr of carbon black (composition 4) resulted in a reduced wear rate (which is indicated by a higher wear index value as calculated herein) as compared to the use of 55 phr of one silica having an intermediary surface area along with 5 phr of carbon black (comparative composition C-1). The use of two different silicas for silica #1 (i.e., the lower surface area silica) in combination with a third silica for silica #2 (i.e., the higher surface area silica) did not result in any improvement in wear index, and, in fact, increased the wear rate as compared to the wear rate achieved by comparative example C-2 (as indicated by the lower wear index value for C-6 as compared to C-2) indicating that in certain instances the use of one silica for silica #1 (i.e., the lower surface area silica) and one silica for silica #2 (i.e., the higher surface area silica) may be more beneficial than two silicas for silica #1 combined with one silica for silica #2. Also, when equivalent amounts of silica #1 and silica #2 in a total amount of 55 phr and 5 phr of carbon black were used in a rubber composition comprising natural rubber and styrene-butadiene copolymer (composition 5) rather than natural rubber and polybutadiene (composition 4), the wear rate was also reduced (which is indicated by a higher wear index value as calculated herein) as compared to the use of 55 phr of silica having an intermediary surface area along with 5 phr of carbon black (comparative composition C-8). However, the same trend was not shown when the rubber composition was comprised entirely of synthetic rubbers (i.e., polybutadiene and styrene-butadiene copolymer in comparative composition C-9) rather than natural rubber in combination with a synthetic rubber. The wear index value for example 4 was calculated by dividing the wear rate (in mg) of control example C-1 by the wear rate (in mg) for example 4 and multiplying by 100. The wear index values for control examples C-2, C-3, and C-6 were calculated by dividing the wear rate for control example C-1 by the wear rate of control examples C-2, C-3, and C-6, respectively, and multiplying by 100. The wear index value for example 5 was calculated using the same procedure except using C-10 as the control. The wear index value for control example C-8 was calculated by dividing the wear rate (in mg) of control example C-9 by the wear rate (in mg) for control example C-8 and multiplying by 100. For ease of reading, the examples within Table 2 have been grouped together with their respective control.

Examples C-11 to C-14 and 6-9

In Examples C-11 to C-14 and 6-9, rubber compositions containing silica filler were prepared using combinations of natural rubber and polybutadiene. Examples 6-9 are provided as working examples of the present disclosure and each utilize a first silica filler and a second silica filler having BET surface areas falling within the ranges described above. Examples C-11 to C-14 are comparative examples. The silica fillers #1, #2 and #3 are as described above. An additional silica, silica #4, was utilized in some of the examples; this silica was obtained from Evonik and had a BET surface area of 250 m²/g. The rubber compositions were prepared in a three stage mixing process (i.e., two master-batch stages, and final batch) according to the formulations shown in Table 3. The amount of each ingredient used is reported as parts per hundred rubber (phr). The mixing process used for these formulations is as outlined in Table 1-A above.

TABLE 3

Varying amounts of silica with 5 phr CB in NR + BR compositions

|  | C-11 | C-12 | C-13 | C-14 | 6 | 7 | 8 | 9 |
|---|---|---|---|---|---|---|---|---|
| Initial Masterbatch | | | | | | | | |
| Natural rubber | 50 | 50 | 50 | 50 | 50 | 50 | 50 | 50 |
| Polybutadiene | 50 | 50 | 50 | 50 | 50 | 50 | 50 | 50 |
| Silica #1 | 0 | 45 | 0 | 0 | 22.5 | 22.5 | 25 | 13.2 |

TABLE 3-continued

Varying amounts of silica with 5 phr CB in NR + BR compositions

|  | C-11 | C-12 | C-13 | C-14 | 6 | 7 | 8 | 9 |
|---|---|---|---|---|---|---|---|---|
| Silica #2 | 0 | 0 | 45 | 0 | 22.5 | 0 | 20 | 0 |
| Silica #3 | 45 | 0 | 0 | 0 | 0 | 0 | 0 | 0 |
| Silica #4 | 0 | 0 | 0 | 45 | 0 | 22.5 | 0 | 31.8 |
| Carbon black | 5 | 5 | 5 | 5 | 5 | 5 | 5 | 5 |
| Silica coupler | 3.6 | 3.6 | 3.6 | 3.6 | 3.6 | 3.6 | 3.6 | 3.6 |
| 6PPD | 0.95 | 0.95 | 0.95 | 0.95 | 0.95 | 0.95 | 0.95 | 0.95 |
| Processing oil | 10 | 10 | 10 | 10 | 10 | 10 | 10 | 10 |
| Wax | 2 | 2 | 2 | 2 | 2 | 2 | 2 | 2 |
| Stearic acid | 2 | 2 | 2 | 2 | 2 | 2 | 2 | 2 |
| Secondary Masterbatch | | | | | | | | |
| Silica #1 | 0 | 10 | 0 | 0 | 5 | 5 | 5.6 | 2.9 |
| Silica #2 | 0 | 0 | 10 | 0 | 5 | 0 | 4.4 | 0 |
| Silica #3 | 10 | 0 | 0 | 0 | 0 | 0 | 0 | 0 |
| Silica #4 | 0 | 0 | 0 | 10 | 0 | 5 | 0 | 7.1 |
| Silica coupler | 0.8 | 0.8 | 0.8 | 0.8 | 0.8 | 0.8 | 0.8 | 0.8 |
| Final Batch | | | | | | | | |
| Sulfur | 1.5 | 1.5 | 1.5 | 1.5 | 1.5 | 1.5 | 1.5 | 1.5 |
| Vulcanizing accelerators | 4 | 4 | 4 | 4 | 4 | 4 | 4 | 4 |
| Zinc oxide | 2.5 | 2.5 | 2.5 | 2.5 | 2.5 | 2.5 | 2.5 | 2.5 |
| Summary | | | | | | | | |
| Total carbon black | 5 | 5 | 5 | 5 | 5 | 5 | 5 | 5 |
| Total silica #1 | 0 | 55 | 0 | 0 | 27.5 | 27.5 | 30.6 | 16.1 |
| Total silica #2 | 0 | 0 | 55 | 0 | 27.5 | 0 | 24.4 | 0 |
| Total silica #3 | 55 | 0 | 0 | 0 | 0 | 0 | 0 | 0 |
| Total silica #4 | 0 | 0 | 0 | 55 | 0 | 27.5 | 0 | 38.9 |
| Total all silicas | 55 | 55 | 55 | 55 | 55 | 55 | 55 | 55 |
| Properties | | | | | | | | |
| Indexed RPA Viscosity | 100 | 95 | 134 | 132 | 111 | 117 | 108 | 121 |
| Wear index (Ctrl = 100) | 100 | 101 | 116 | 112 | 117 | 112 | 118 | 120 |

Of the four control rubber compositions (C-11 to C-14), the composition comprising 55 phr of silica having a BET surface area of 300 m²/g (comparative example C-13) had the lowest wear rate (as evidenced by the higher wear index value). Each of inventive rubber compositions 6-9 had a lower wear rate (as indicated by the higher wear index value) than control rubber composition C-11. Unexpectedly, the use of ½ as much silica having a BET surface area of 300 m²/g with an equivalent amount of silica having a much lower BET surface area of 160 m²/g (composition 6) did not result in any increase in wear rate (which would have been indicated by a lower wear index value as calculated herein) as compared to the use of all silica having a BET surface area of 300 m²/g (control composition C-13), as evidenced by the relatively higher wear index value for example 6 as compared to that for control example C-13. Moreover, even when the amount of silica having a BET surface area of 300 m²/g was further reduced and was used with relatively more silica having a much lower surface area of 160 m²/g (composition 8), the wear rate did not increase as compared to the use of all silica having a BET surface area of 300 m²/g (control composition C-13), as evidenced by the relatively higher wear index value for example 8 as compared to that for control example C-13. These results are surprising because the average surface area of the silica utilized in examples 6 and 8 was lower than the average surface area of the silica utilized in control composition C-13, and an increase in wear rate (which would yield a decreased wear index value as calculated herein) would have been expected.

(The average surface area of the silica utilized in a rubber composition can be calculated as follows. Multiply the relative weight percent of a first silica (i.e., the weight percent of the first silica as a percentage of the total amount of silica filler) by that silica's surface area and add that product to the product of the relative weight percent of a second silica times that silica's surface area. As non-limiting examples, the average surface area of the silica utilized in example 6 would be 230 m²/g, the average surface area of the silica utilized in example 8 would be 222 m²/g and the average surface area of the silica utilized in control composition C-13 would be 300 m²/g.) Similarly, the use of ½ as much silica having a BET surface area of 250 m²/g with an equivalent amount of silica having a lower BET surface area of 160 m²/g (example 7) did not result in any increase in wear rate (which would have yielded a decreased wear index value as calculated herein) as compared to the use of all silica having a surface area of 250 m²/g (control composition C-14). A similar result is seen in example 9 as compared to control composition C-14. Again, these results are surprising because the average surface area of the silica utilized in examples 7 and 9 was lower than the average surface area of the silica utilized in control example C-14, and an increase in wear rate (which would have yielded a decreased wear index value as calculated herein) would have been expected. The wear index values for control examples C-12 to C-14 and examples 6-9 were calculated using control example C-11 as a control (e.g., the wear index value for example 6 was calculated by dividing the wear rate (in mg)

of control example C-11 by the wear rate (in mg) for example 6 and multiplying by 100).

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A rubber composition comprising:
   a. natural rubber, polyisoprene, or a combination thereof;
   b. at least one conjugated diene monomer containing polymer or copolymer;
   c. a first silica filler having a BET surface area of at least 220 $m^2/g$;
   d. a second silica filler having a BET surface area lower than that of the first silica filler and greater than 145 $m^2/g$;
   e. optionally carbon black filler;
   wherein the total amount of first silica filler and second silica filler comprises at least 20 phr, and the first and second silica fillers are present in relative amounts by weight of 30:70 to 70:30, respectively, and
   the total amount of (a) and (b) is 100 parts with (a) comprising at least 25% by weight of those 100 parts.

2. The rubber composition of claim 1, wherein carbon black is present in an amount of 5-50 phr.

3. The rubber composition of claim 1, wherein the at least one conjugated diene monomer-containing polymer or copolymer (b) comprises polybutadiene, styrene-butadiene copolymer, polyisoprene, or a combination thereof.

4. The rubber composition of claim 1, wherein the second silica filler has a BET surface area of 150 to less than 220 $m^2/g$.

5. The rubber composition of claim 1, wherein the first silica filler has a BET surface area of 240-350 $m^2/g$.

6. The rubber composition of claim 1, wherein the total amount of first silica filler and second silica filler comprises 40-120 phr.

7. The rubber composition of claim 1, further comprising at least one silica coupling agent in a coupling agent to total silica filler ratio of 1:100 to 1:5.

8. A rubber composition comprising:
   a. natural rubber, polyisoprene, or a combination thereof;
   b. at least one conjugated diene monomer comprising polybutadiene, styrene-butadiene copolymer, or a combination thereof;
   c. a first silica filler having a BET surface area of about 220 to about 350 $m^2/g$;
   d. a second silica filler having a BET surface area lower than that of the first silica filler and at least about 150 $m^2/g$;
   e. carbon black filler in an amount of 5-15 phr;
   wherein the total amount of first silica filler and second silica filler is 40-120 phr, and the first and second silica fillers are present in relative amounts by weight of 30:70 to 70:30, respectively, and the total amount of (a) and (b) is 100 parts with (a) comprising at least 25% by weight of those 100 parts.

9. The rubber composition of claim 8, wherein (b) includes a styrene-butadiene copolymer having a silica-reactive functional group.

10. The rubber composition of claim 8, wherein (a) comprises up to about 50% by weight of the 100 parts of (a) and (b).

11. A process for preparing a rubber composition having an improved wear index, the process comprising:
    (a) providing ingredients comprising:
        (i) a first silica filler having a BET surface area of at least 220 $m^2/g$, (ii) a second silica filler having a BET surface area lower than that of the first silica filler and greater than 145 m²/g,
(iii) natural rubber, polyisoprene, or a combination thereof;
(iv) at least one conjugated diene monomer-containing polymer or copolymer;
(v) optionally carbon black; and
(vi) a cure package, wherein the total amount of first silica filler and second silica filler comprises at least 20 phr, and the first and second silica fillers are present in relative amounts by weight of 30:70 to 70:30, respectively; and the total amount of (iii) and (iv) is 100 parts with (iii) comprising at least 25% by weight of those 100 parts;

(b) preparing a masterbatch comprising (i)-(v);
(c) preparing a final batch comprising the masterbatch of (b) and the cure package, thereby resulting in a final rubber composition.

12. The process of claim 11, wherein (b) comprises producing an initial masterbatch comprising at least a majority of (i), optionally up to a minority of (ii), at least a portion of (iii), at least a portion of (iv), at least a portion of (v), followed by producing a secondary masterbatch comprising the initial masterbatch, at least a majority of (ii), and any remaining (i), (iii), (iv) and (v); and (c) comprises addition of the secondary masterbatch and the cure package.

13. The process of claim 12, wherein the entirety of (i) and (ii) are added in the initial masterbatch.

14. The process of claim 11, further comprising at least one remill mixing step subsequent to any masterbatch step but prior to preparing the final batch.

15. The process of claim 11, wherein the final rubber composition comprises the rubber composition having an improved wear index and the improved wear index comprises at least 5% improvement in wear index as compared to a rubber composition having equivalent ingredients other than replacing the first and second silica fillers with an equivalent amount of a filler having a surface area intermediary to that of the first and second silica fillers.

16. The process of claim 11, wherein the ingredients comprise carbon black in an amount of 5-50 phr.

17. The process of claim 11, wherein the at least one conjugated diene monomer-containing polymer or copolymer (b) comprises polybutadiene, styrene-butadiene copolymer, polyisoprene, or a combination thereof.

18. The process of claim 11, wherein the second silica filler has a BET surface area of 150-220 m²/g.

19. The process of claim 11, wherein the first silica filler has a BET surface area of 240-350 m²/g.

20. The process of claim 11, wherein the total amount of first silica filler and second silica filler comprises 40-120 phr.

* * * * *